Feb. 10, 1931.  C. W. LINFESTY  1,791,728
ROLLER CLEANING AND OILING DEVICE FOR DRIERS
Filed Oct. 15, 1928  2 Sheets-Sheet 1
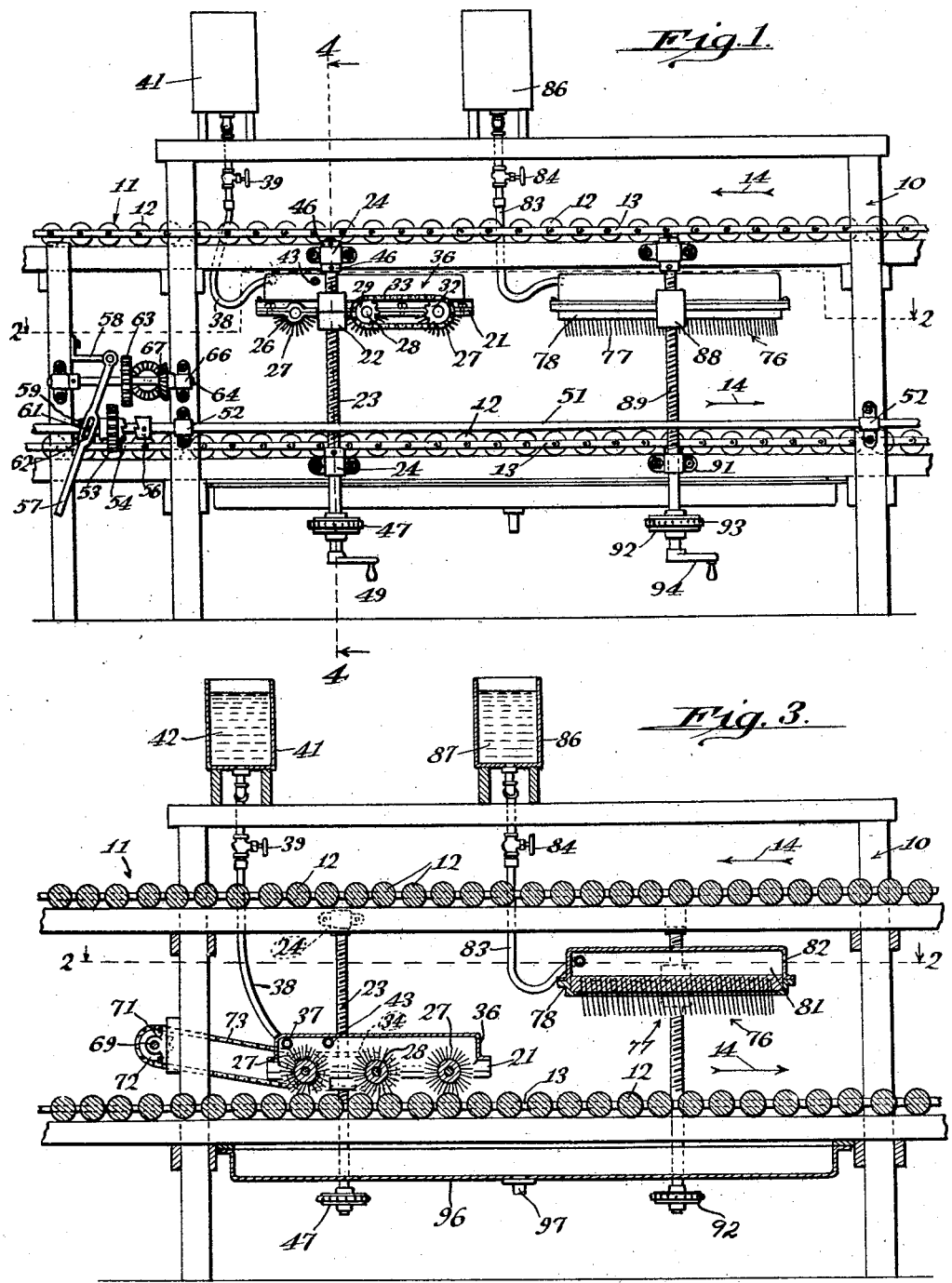

Feb. 10, 1931.  C. W. LINFESTY  1,791,728
ROLLER CLEANING AND OILING DEVICE FOR DRIERS
Filed Oct. 15, 1928  2 Sheets-Sheet 2
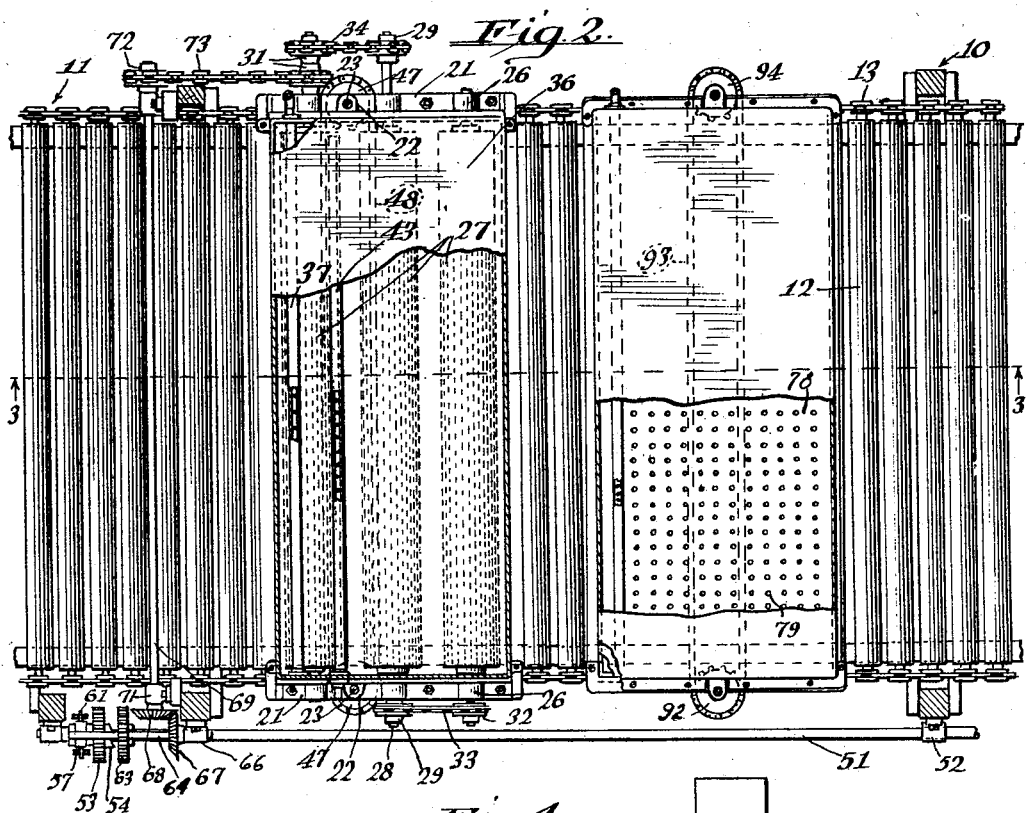
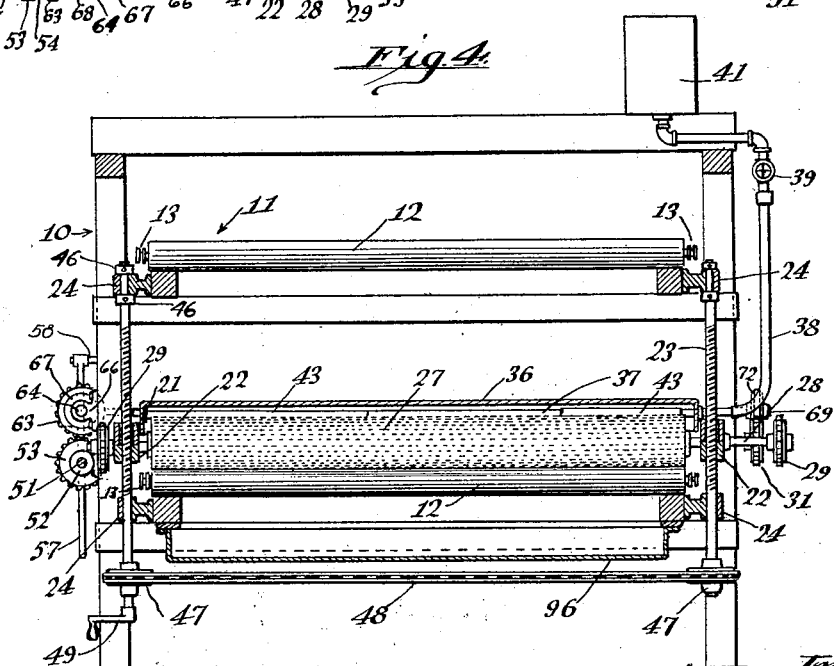

Patented Feb. 10, 1931

1,791,728

UNITED STATES PATENT OFFICE

CHARLES W. LINFESTY, OF HIGHLAND, CALIFORNIA, ASSIGNOR TO STEBLER PARKER CO., OF RIVERSIDE, CALIFORNIA, A CORPORATION OF CALIFORNIA

ROLLER CLEANING AND OILING DEVICE FOR DRIERS

Application filed October 15, 1928. Serial No. 312,674.

This invention relates to fruit driers, and more especially to that type of fruit drier which includes a conveyer made up of a plurality of rollers.

In the drying of certain fruits, most notably citrus fruits, the fruit is conveyed through the evaporating chamber of the drier by means of a conveyer; and frequently, this conveyer is of a type which includes a plurality of rollers connected by a flexible coupling such as a chain associated with each end of the rollers. One of the inherent disadvantages of this type of fruit drier, results from the fact that a residue collects upon the rollers, this residue being formed of oils from the fruit, dust, and other substances such as the various chemicals with which citrus fruits are treated while in preparation for packing. Consequently, it is necessary more or less frequently, to shut down the machine to permit removal of this collected deposit. The general object of my invention is the provision of improved means for facilitating the operation of cleaning the rollers of fruit driers of the general character described.

Another object is the provision of means for applying a coating of oil to the rollers after they have been cleansed.

With these objects in view, the device of the present invention constitutes an improvement over that of my copending application, Serial No. 270,999, filed April 18, 1928.

One of my objects is the provision of means for moving the cleansing and oiling devices, at will into or out of engagement with the conveyer, these moving means being simpler and capable of being more easily operated than the corresponding means of my copending application above mentioned.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a side elevation of a portion of the roller conveyer of a citrus fruit drier, with cleansing and oiling devices embodying my invention, in operative position in respect thereto.

Fig. 2 is a compound, horizontal sectional view, the planes of section being indicated by the lines 2—2 of Fig. 1, with the direction of view indicated by the arrows. Portions of the structure upon which the cleansing and oiling brushes are mounted, are broken away to better disclose the nature of the invention.

Fig. 3 is a longitudinal, vertical sectional view, the plane of section being indicated by the line 3—3 of Fig. 2, and the direction of view as indicated.

Fig. 4 is a transverse, vertical sectional view taken upon the line 4—4 of Fig. 1, with the direction of view as indicated.

The present invention comprises a rotary brush for cleansing a conveyer, and a flat brush for applying oil to the conveyer, and screw-operated means for moving the brushes optionally into or out of engagement with the conveyer.

Describing in greater detail a specific embodiment of my invention, the cleansing and oiling apparatus is shown mounted on a conventional citrus fruit drier which comprises a rigid supporting structure 10 which carries an endless belt 11 made up of a plurality of rollers 12 inter-connected by chains 13 or their equivalent. The arrows 14 of Figs. 1 and 3, indicate the direction of travel of the belt 11 as it transports citrus fruits or other commodities through the drier while they are being subjected to heat or other desired treatment.

One of the principal difficulties encountered in the drying of citrus fruits, results from the fact that after the fruit is subjected to heat, oils issue from the fruit and collect upon the rollers in the form of a gummy substance which tends to seriously hamper the satisfactory operation of the conveyer. Hence, it becomes necessary frequently, to shut down the entire machine and remove this collected oil. It is to facilitate this cleansing process and to apply a protective coating of oil or other substance, that the device of the present invention has been produced.

The cleansing apparatus comprises a frame 21 extending transversely of the conveyer 11, and preferably between the upper and lower runs thereof. The frame 21 is provided at each end with a bracket 22 rigid therewith, these brackets having vertically disposed threaded apertures therethrough for the threaded engagement of screw shafts 23. The shafts 23 are journalled in brackets 24 rigid with the supporting structure 10, as best shown upon Fig. 1.

In practicing the invention, I provide brushing means mounted near the conveyor and capable of being brought at will into active operation.

Preferably a plurality of bearings 26 are carried by the frame 21 at each end thereof, arranged in aligned pairs for the mounting of rotary brushes 27 therein. While any desired number of brushes 27 may be employed, the invention is herein described as being provided with three. The shaft 28 of the center brush 27, is provided with sprockets 29 upon each end, and a pair of sprockets 31 are also provided adjacent one end of the shaft 28 upon which one of the outer brushes is mounted. The shaft 28 of the other outer brush carries a single sprocket 32 which is connected by a driving chain 33 to one of the sprockets 29 of the center shaft 28. The other sprocket 29 is connected by a driving chain 34 to the sprocket 31 upon the same side of the conveyer, with the result that the other sprocket 31 is left free for the reception of driving means to be described hereinafter.

A hood 36 is carried by the frame 21 over the brushes 27, this hood being provided with a foraminated pipe 37 connected by a flexible conduit 38 and through a suitable supply valve 39 to a reservoir 41 for either clear or soapy water 42 or any other desired cleansing solution. A second foraminated pipe 43 may also be provided within the hood 36 to permit the spraying of water under pressure from any desired source of supply. Means are provided for rotating simultaneously, the shaft 23 associated with opposite sides of the frame 21. It is to be understood that the shafts 23 are journalled within the brackets 24 for rotary movement only, and are provided with thrust collars 46 preventing longitudinal displacement thereof. Each of the shafts 23 has a sprocket 47 rigid therewith preferably below the plane of the lower run of the conveyer 11. An endless chain 48 is mounted upon these sprockets in such a manner that both shafts 23 may be rotated simultaneously at the same speed and in the same direction. A crank 49 is provided upon the lower end of one of the shafts 23 to effect this rotation of both shafts 23 with the consequent lowering or raising of the frame 21, depending upon the direction of rotation of the crank 49.

Means are provided for driving the rotary brushes 27. Power may be derived from any suitable power shaft such as the shaft 51 journalled in suitable boxes 52 carried by the supporting structure 10. A gear 53 is mounted for rotation upon the shaft 51 and carries one element 54 of a clutch, the other element 56 being rigidly attached to the shaft 51. The gear 53 is also capable of a certain degree of sliding movement upon the shaft 51, and this sliding may be effected by a clutch lever 57 mounted to rock upon a bracket 58 rigid with a portion of the supporting structure 10. The gear 53 carries a sleeve 59 rotatable but held against longitudinal displacement in respect thereto. A pin 61 rigid with the sleeve 59, extends through a slot 62 in the handle 57 so that sliding of the gear 53 upon the shaft 51 may be effected by swinging the handle 57. When the gear 53 is slid to the right when viewed as in Fig. 1, the clutch members 54 and 56 are brought into engaging position. This same movement brings the gear 53 into mesh with a gear 63 rigid with a countershaft 64 journalled in boxes 66 upon the structure 10. This countershaft 64 also carries a beveled gear 67 enmeshed with a complementary beveled gear 68 carried by a transversely extending shaft 69. This shaft is journalled in suitable boxes 71 and carries at one end a sprocket 72. When the frame 21 is lowered to that position in which the brushes 27 engage the rollers of the lower run of the conveyer 11, a chain 73 may be engaged upon the sprocket 72 and the other sprocket 31. It would be entirely within the field of my invention to employ some flexible drive means, obviating the necessity of removing the chain 73 when the frame 21 is elevated out of roller-engaging position. However, occasion arises only at relatively infrequent intervals for the employment of the cleansing device, and therefore the manner of driving the brushes 27 above disclosed, is considered the preferred form because of its simplicity and relatively lower cost.

A flat brush 76 is also provided preferably located adjacent the frame 21. The bristles 77 of the brush 76 are mounted in a back 78 having a plurality of foraminations 79 therein leading to a reservoir 81 closed by a removable top 82. This reservoir 81 is connected by a suitable flexible conduit 83 and supply valve 84, to a reservoir 86, for the reception of oil 87. The brush 76 is mounted similarly to the frame 21, being provided with threaded brackets 88 within which screw shafts 89 are engaged, these screw shafts being similarly mounted in brackets 91 and provided with sprockets 92 connected by an endless chain 93. One of the shafts 89 is also provided with an operating crank 94.

The manner of operating the cleansing and oiling device of my invention is believed to be apparent from the above description of their constituent parts. The brushes 27 may be lowered into engagement with the rollers 12 by turning the crank 49 in the proper direction. Then, the chain 73 should be engaged upon the drive sprockets 72 and the driven sprocket 31, after which the clutch 54, 56, should be closed for effecting rotation of all of the brushes 27. Soapy water or other suitable cleansing solution may then be supplied to the brushes 27 by opening the valve 39. The preferable arrangement is to have the foraminated pipe 37 adjacent that brush 27 with which the rollers 12 first come in contact as they move past the scrubbing device. This will result in the thorough saturation of the deposit upon the rollers, with the cleansing fluid; and then as the rollers pass the other brushes 27 which are relatively dry, they will be subjected to a thorough scrubbing action. After this scrubbing has been carried out as long as desired, the valve 39 should be closed and then clear water supplied through the foraminated pipe 43 to rinse the rollers. It should be observed that a drippan 96, having a drain pipe 97, is positioned below that portion of the conveyer 11 with which the cleansing and oiling devices come in contact. Therefore, the first cleansing solution and rinse water, as well as the deposit removed from the rollers, collects in the drip-pan 96 and may be withdrawn through the outlet 97.

The next step is to stop the rotary brushes 27 by opening the clutch 54, 56, and then raising the frame 21 by rotating the handle 49 in the opposite direction. As clearly shown upon Fig. 3, the shaft 69 is higher than the shafts 28 upon which the brushes 29 are mounted, when the frame 21 is in operating position. This permits raising of the frame 21 a distance sufficient for the passage of fruit below the brushes 27 in the normal operation of the conveyer, without the necessity of removing the chain 73 from the sprockets 72 and 31. However, it should be observed that if it is desired to raise the frame 21 higher than the position thereof which can be attained without removal of the chain 73, this chain may easily be removed, permitting movement of the frame 21 to any desired position within the limits of the screw 23.

The oiling device should then be lowered by its operating crank 94, so that the bristles 77 contact the rollers 12 as they move past the brush 76. These bristles 77 being saturated with oil from the reservoir 71, apply a protective coating of oil to the rollers, serving to preserve them against rust. After the rollers have been thoroughly oiled, the crank 94 should be rotated in the reverse direction to withdraw the brush 76 from engagement with the conveyer, and permit subsequent operation thereof.

It is to be understood that the details of the invention as herein disclosed, are subject to alteration within the spirit or scope of the appended claims.

I claim:

1. In a fruit drier including an endless conveyer with an upper run and a lower run, a brush mounted between the runs of said conveyer, and screw-operated means for normally holding the brush away from the conveyer, and for moving the brush at will into engagement with said conveyer.

2. In a fruit drier including a conveyer comprising a plurality of rollers, a frame movably mounted adjacent said conveyer, a rotary brush journalled upon said frame, means for rotating said brush, and screw-operated means for moving the frame to carry said brush at will into or out of roller-engaging position.

3. In a fruit drier including a conveyer comprising a plurality of rollers, a frame movably mounted adjacent said conveyer, a rotary brush journalled upon said frame, means for rotating said brush, means including screw shafts at the ends of the frame for moving the frame to carry said brush at will into or out of engagement with the rollers, and a chain connecting the screw shafts for moving the same in unison.

4. In a fruit drier including a rigid structure and a roller conveyer carried by said structure for movement thereupon; a frame extending transversely of said conveyer, a rotary brush journalled upon said frame, means for rotating said brush, a bracket rigid with each end of said frame and having a threaded aperture therethrough, a screw shaft threadedly engaged within each of said brackets and journalled upon said rigid structure to extend transversely to the plane of said conveyer, and means whereby said shafts may be rotated to move said brush at will into or out of engagement with said conveyer.

5. In a fruit drier including a rigid structure and a roller conveyer carried by said structure for movement thereupon; a frame extending transversely of said conveyer, a rotary brush journalled upon said frame, manually-controlled means for rotating said brush, a bracket rigid with each end of said frame and having a threaded aperture therethrough, a screw shaft threadedly engaged within each of said brackets and journalled upon said rigid structure perpendicularly to the plane of said conveyer, and means for rotating said shafts to move said brush at will into or out of engagement with said conveyer.

6. In a fruit drier including a rigid structure and a roller conveyer carried by said structure for movement thereupon; a frame extending transversely of said conveyer, a rotary brush journalled upon said frame, means for rotating said brush, a bracket rigid with each end of said frame and having a threaded aperture therethrough, a screw shaft threadedly engaged within each of said brackets and journalled upon said rigid structure perpendicularly to the plane of said conveyer, a crank secured to one of said shafts, a sprocket rigid with each of said shafts and a driving chain connecting said sprockets.

7. In a fruit drier including an endless conveyer having an upper run and a lower run, and comprising a plurality of rollers, a rotary brush located above the lower run of said conveyer, means for rotating said brush, a second brush arranged adjacent said conveyer, brackets associated with said brushes and having threaded apertures therethrough, screw shafts located respectively at opposite ends of the brushes engaged within said apertures, normally holding the brushes out of contact with the rollers, and means for rotating said screw shafts to move said brushes at will into or out of engagement with the rollers as they move past the same.

8. In a fruit drier including a conveyer comprising a plurality of rollers and a rigid structure supporting said conveyer; a flat brush disposed above said conveyer, a bracket upon each end of said flat brush and having a threaded aperture therethrough, a screw shaft threadedly engaged within each of said brackets and journalled upon said rigid structure, a sprocket rigid with each shaft, a chain engaged upon both sprockets, and a crank rigid with one of the shafts, said shafts being disposed perpendicularly to the plane of said conveyer.

9. In a fruit drier including a conveyer comprising a plurality of rollers and a rigid structure supporting said conveyer; a flat brush disposed above said conveyer, a bracket upon each end of said flat brush and having a threaded aperture therethrough, a screw shaft threadedly engaged within each of said brackets and journalled upon said rigid structure, a sprocket rigid with each shaft, a chain engaged upon both sprockets, a crank rigid with one of the shafts, said shafts being disposed perpendicularly to the plane of said conveyer, a reservoir upon the back of said flat brush, the back of said flat brush being provided with foraminations therethrough leading from the reservoir to the bristles, and means for supplying oil to said reservoir.

10. In a fruit drier including an endless conveyor with an upper run and a lower run, brushing means including a rotary brush located between the runs of said conveyor, and screw-operated means for normally holding the brushing means out of contact with the conveyor and for moving the brushing means at will into operative engagement with said conveyor.

11. In a fruit drier including an endless conveyor with an upper run and a lower run, brushing means including a brush mounted between the runs of said conveyor, and means for normally holding the brushing means out of operative engagement with the said conveyor, and for moving the brushing means at will into operative engagement with the conveyor.

In testimony whereof I have signed my name to this specification.

C. W. LINFESTY.